US012548952B2

(12) United States Patent

Qiu et al.

(10) Patent No.: US 12,548,952 B2
(45) Date of Patent: Feb. 10, 2026

(54) CONNECTOR, FUNCTIONAL BOARD, AND BOARD-LEVEL ARCHITECTURE

(71) Applicant: HUAWEI TECHNOLOGIES CO., LTD., Guangdong (CN)

(72) Inventors: Shuang Qiu, Dongguan (CN); Jun Chen, Dongguan (CN); Wang Xiong, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 314 days.

(21) Appl. No.: 18/338,474

(22) Filed: Jun. 21, 2023

(65) Prior Publication Data

US 2023/0335954 A1 Oct. 19, 2023

Related U.S. Application Data

(63) Continuation of application No. PCT/CN2021/139888, filed on Dec. 21, 2021.

(30) Foreign Application Priority Data

Dec. 22, 2020 (CN) ......................... 202011527768.6

(51) Int. Cl.

*H01R 13/6587* (2011.01)
*H01R 12/72* (2011.01)
*H01R 12/73* (2011.01)

(52) U.S. Cl.

CPC ....... *H01R 13/6587* (2013.01); *H01R 12/724* (2013.01); *H01R 12/737* (2013.01)

(58) Field of Classification Search

CPC .................................................. H01R 13/6594

(Continued)

(56) References Cited

U.S. PATENT DOCUMENTS 8,308,512 B2 * 11/2012 Ritter .................. H01R 12/727
439/607.18
9,985,389 B1 5/2018 Morgan et al.

(Continued)

FOREIGN PATENT DOCUMENTS

| | | | |
|---|---|---|---|
| CN | 110838635 | A | 2/2020 |
| JP | H037281 | U | 1/1991 |
| JP | 2012099402 | A | 5/2012 |

*Primary Examiner* — Phuong K Dinh
(74) *Attorney, Agent, or Firm* — Rimon PC

(57) ABSTRACT

A connector includes an end protector and lead frames. Each lead frame includes a plurality of connection terminal groups and a shield layer. Each connection terminal group includes two connection terminals configured to transmit a signal. Each connection terminal has a first connection end that cooperates with insertion of a circuit board. The shield layer is configured to electromagnetically isolate connection terminal groups in adjacent lead frames. An end protector includes a conductive structure that is located between the first connection ends of the two connection terminals in each connection terminal group. In the foregoing technical solution, with the conductive structure on the end protector, a transmission path of a loop signal corresponding to a differential signal transmitted by each connection terminal group is improved, crosstalk between loop signals corresponding to different connection terminal groups is reduced, and communication effect of the connector is improved.

19 Claims, 10 Drawing Sheets

(58) Field of Classification Search
USPC ........................................ 439/607.07, 607.11
See application file for complete search history.

(56) References Cited

U.S. PATENT DOCUMENTS

| | | | | |
|---|---|---|---|---|
| 11,489,289 | B2 * | 11/2022 | Liu .................... | H01R 13/6471 |
| 2010/0144165 | A1 | 6/2010 | Fowler et al. | |
| 2014/0073173 | A1 | 3/2014 | Yang | |

* cited by examiner

CONNECTOR, FUNCTIONAL BOARD, AND BOARD-LEVEL ARCHITECTURE

CROSS-REFERENCE TO RELATED APPLICATIONS

This application is a continuation of International Application No. PCT/CN2021/139888, filed on Dec. 21, 2021, which claims priority to Chinese Patent Application No. 202011527768.6, filed on Dec. 22, 2020. The disclosures of the aforementioned applications are hereby incorporated by reference in their entireties.

TECHNICAL FIELD

This application relates to the field of communication technologies, and in particular, to a connector, a functional board, and a board-level architecture.

BACKGROUND

In a current communication device system, an interconnection system combining a PCB-based backplane and a PCB-based subboard is a most common interconnection architecture. Various subboards are connected to the backplane through backplane connectors. As a connection bridge between the backplane and the subboard, the connector is a key architecture-level component.

The backplane connector is usually required to be able to support evolved upgrades of a product over a life cycle. For high-speed electrical performance specifically, the backplane connector typically needs to support at least two generations of rate upgrades. As a rate is upgraded, the system has a stricter requirement for high-speed electrical performance of the connector. Most critical electrical performance indicators mainly are crosstalk, loss, and reflection. Crosstalk is usually classified into far-end crosstalk and near-end crosstalk. Crosstalk is presented as injection of noise into a victim network, directly reduces a signal-to-noise ratio of a signal, and causes deterioration to quality of signal transmission.

As rates of current main communication products evolve to 56 Gbps or even to 112 Gbps, crosstalk noise is becoming a major challenge for the backplane connector. However, a backplane connector in the conventional technology has excessive crosstalk noise and cannot meet a requirement.

SUMMARY

This application provides a connector, a functional board, and a board-level architecture, to reduce crosstalk in a connector.

According to a first aspect, a connector is provided. The connector is used in a board-level architecture to connect a backplane and a plug-in board. The connector includes an end protector and a plurality of stacked lead frames. The plurality of lead frames are stacked in a first direction. Each lead frame includes a plurality of connection terminal groups and a shield layer. Each connection terminal group includes two connection terminals configured to transmit a signal. Each connection terminal has a first connection end that cooperates with insertion of a circuit board. The shield layer is configured to electromagnetically isolate connection terminal groups in adjacent lead frames. The end protector includes a conductive structure that is located between the first connection ends of the two connection terminals in each connection terminal group. The conductive structure is electrically connected to the corresponding shield layer of the connection terminal group, and is configured to transmit a loop signal corresponding to the signal. In the foregoing technical solution, with the conductive structure that is on the end protector, a transmission path of a loop signal corresponding to a differential signal transmitted by each connection terminal group is improved, reducing crosstalk between loop signals corresponding to different connection terminal groups, and improving a communication effect of the connector.

In a specific implementable solution, the end protector further includes a shield structure that is configured to electromagnetically isolate two adjacent connection terminal groups in each lead frame, and the shield structure is electrically connected to the corresponding shield layer of the terminal groups. With the shield structure that is disposed on the end protector, electromagnetic isolation is implemented between different connection terminal groups in a lead frame.

In a specific implementable solution, the shield structure includes a first protrusion and a second protrusion, there is a gap between the first protrusion and the second protrusion, and the first protrusion and the second protrusion are electrically connected to the corresponding shield layer separately. With the first protrusion and the second protrusion, a contact area between the shield structure and the shield layer is increased, further improving an electrical connection effect between the shield structure and the shield layer, and improving an electromagnetic isolation effect between different connection terminal groups.

In a specific implementable solution, each shield layer is provided with protruding structures that are used for one-to-one correspondences with corresponding shield structures, and the protruding structure is inserted into a gap between a first protrusion and a second protrusion of the corresponding shield structure, and is electrically connected to both the first protrusion and the second protrusion. With the protruding structure electrically connected to the first protrusion and the second protrusion, the contact area between the shield structure and the shield layer is increased, further improving the electrical connection effect between the shield structure and the shield layer, and improving the electromagnetic isolation effect between different connection terminal groups.

In a specific implementable solution, the protruding structure is in different shapes such as a triangle or a rectangle. With different protruding structures, electrical connection to the first protrusions and the second protrusions can be implemented.

In a specific implementable solution, each shield layer is provided with notches that correspond to first protrusions and second protrusions of corresponding shield structures, and the first protrusions and the second protrusions are respectively inserted into the corresponding notches and electrically connected to the corresponding shield layer. With the notches fitting with the first protrusions and the second protrusions, the contact area between the shield structure and the shield layer is increased, further improving the electrical connection effect between the shield structure and the shield layer, and improving the electromagnetic isolation effect between different connection terminal groups.

In a specific implementable solution, a height of the shield structure is greater than a height of the conductive structure. In this way, the electromagnetic isolation effect between different connection terminal groups is improved.

In a specific implementable solution, a minimum distance between any connection terminal in each connection terminal group and a conductive structure corresponding to the connection terminal group is a first distance, a minimum distance between any connection terminal in each connection terminal group and a shield structure corresponding to the connection terminal group is a second distance, and the first distance is less than the second distance. In this way, a return path of a loop signal is improved.

In a specific implementable solution, each connection terminal group further includes an insulation layer; the insulation layer wraps the plurality of connection terminal groups, with the first connection end of each connection terminal exposed outside the insulation layer; the insulation layer is provided with a hollow-out structure; and each connection terminal group is partially exposed in the hollow-out structure. By hollowing out the insulation layer, usage of the insulation layer is reduced when isolation effects between different connection terminal groups and between different connection terminals are ensured, further reducing a dielectric loss caused by a characteristic of the insulation layer.

In a specific implementable solution, one connection terminal in each connection terminal group is located at a first terminal layer, the other connection terminal in the connection terminal group is located at a second terminal layer, the first terminal layer and the second terminal layer are stacked in the first direction, the insulation layer includes a first sub-insulation layer and a second sub-insulation layer, the first sub-insulation layer wraps the first terminal layer, and the second sub-insulation layer wraps the second terminal layer. With different sub-insulation layers wrapping different connection terminal layers, it is easy to manufacture and assemble.

In a specific implementable solution, the first sub-insulation layer and the second sub-insulation layer each have the hollow-out structure. In this way, the dielectric loss caused by the characteristic of the insulation layer is reduced.

In a specific implementable solution, the connector further includes an insulation housing, each connection terminal has a second connection end configured to fit with a connector at a peer end, and the insulation housing wraps the second connection end.

In a specific implementable solution, the conductive structure and the end protector are of an integrated structure, or the conductive structure and the end protector are of a split structure, with the conductive structure electrically connected to the end protector. In this way, the conductive structure is disposed in different manners.

According to a second aspect, a functional board is provided. The functional board includes a circuit board, and the connector according to any one of the foregoing items that is disposed on the circuit board. A connection end of each connection terminal is electrically connected to a circuit layer of the circuit board. In the foregoing technical solution, with the shield structure that is disposed on the end protector, electromagnetic isolation is implemented between different connection terminal groups in a lead frame. With the conductive structure that is on the end protector, a transmission path of a loop signal corresponding to a signal transmitted by each connection terminal group is improved, reducing crosstalk between loop signals corresponding to different connection terminal groups, and improving a communication effect of the connector.

According to a third aspect, a board-level architecture is provided. The board-level architecture includes a backplane and a plug-in board. At least one of the backplane and the plug-in board is the foregoing functional board. The backplane and the plug-in board are connected through a connector. In the foregoing technical solution, with the shield structure that is disposed on the end protector, electromagnetic isolation is implemented between different connection terminal groups in a lead frame. With the conductive structure that is on the end protector, a transmission path of a loop signal corresponding to a signal transmitted by each connection terminal group is improved, reducing crosstalk between loop signals corresponding to different connection terminal groups, and improving a communication effect of the connector.

DESCRIPTION OF EMBODIMENTS

For ease of understanding a connector provided in embodiments of this application, the following first describes several terms related to the connector.

Shield layer: A shield layer is an entire metal sheet, requires a ground signal, and has an electromagnetic shielding effect.

Connection terminal: A connection terminal is a metal lead used to transmit a signal or provide a return path for a signal.

Crosstalk: Crosstalk is a coupling effect of interference caused by a harmful electrical signal when the harmful signal is transferred from one network to another. Crosstalk in this application is crosstalk between different connection terminal groups.

Insertion loss: Insertion loss is loss of energy during transmission of a signal from one end of a terminal to the other end of the terminal.

Lead frame: A lead frame is a main structure including a signal terminal, a shield conductor, and an insulator that are of a connector.

Figure 1:
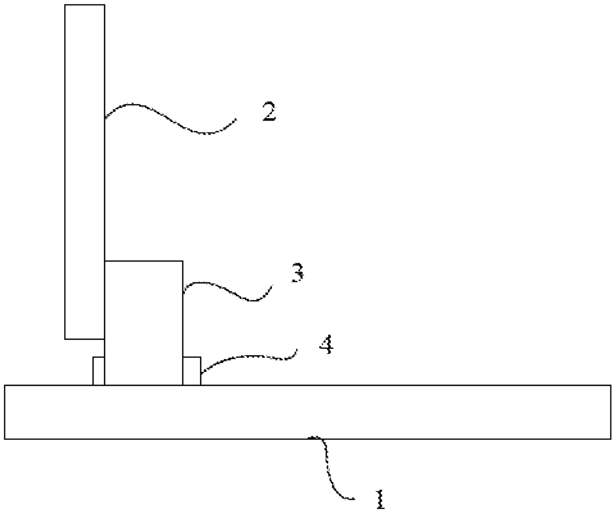
FIG. 1 is a schematic diagram of a structure of a board-level architecture in the conventional technology.

The following first describes an application scenario of the connector provided in embodiments of this application. The connector provided in embodiments of this application is used on functional boards such as a backplane and a service board, and is used as a connection device for different functional boards in a board-level architecture. Refer to FIG. 1. A connector provided in an embodiment of this application is used in a board-level architecture. A backplane 1 and a subboard 2 are connected through connectors. As shown in FIG. 1, the backplane 1 is provided with a first connector 4, and the subboard 2 is provided with a second connector 3. When the backplane 1 and the subboard 2 are connected, the first connector 4 and the second connector 3 fit with each other to implement connection between the backplane 1 and the subboard 2.

Figure 2:
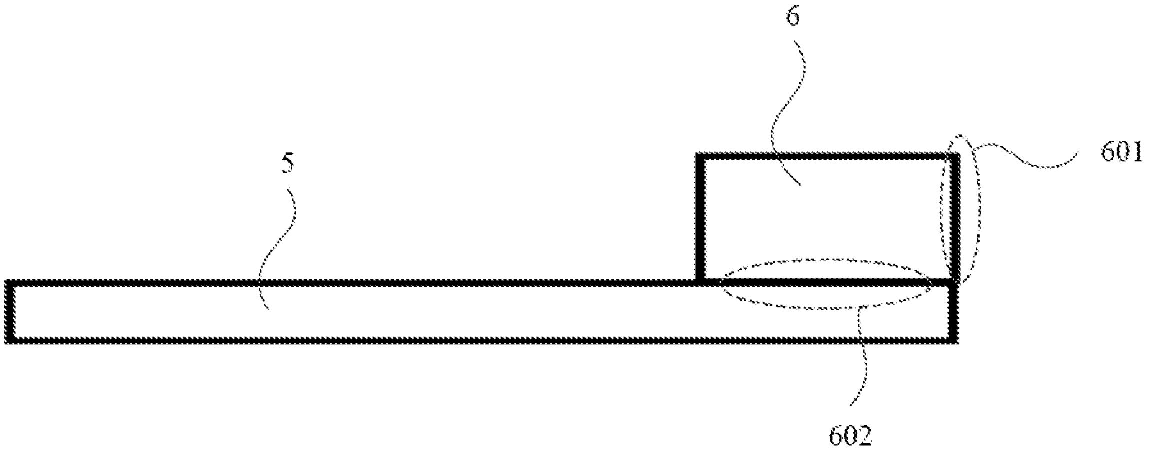
FIG. 2 is a schematic diagram of an application scenario of a connector according to an embodiment of this application.

Refer to FIG. 2. A subboard is used as an example. Each subboard includes a circuit board 5 and a connector 6 disposed on the circuit board 5. Two ends of the connector 6 have a first connection port 601 and a second connection port 602, respectively. The first connection port 601 is configured to fit with a connector at a peer end. The second connection port 602 is configured to be electrically connected to the circuit board 5. In a signal transmission process, a signal flows into a circuit layer of the circuit board through a connection terminal, and a loop signal flows into a shield layer of the connector through a ground layer of the circuit board, thus forming a signal loop.

Figure 3:
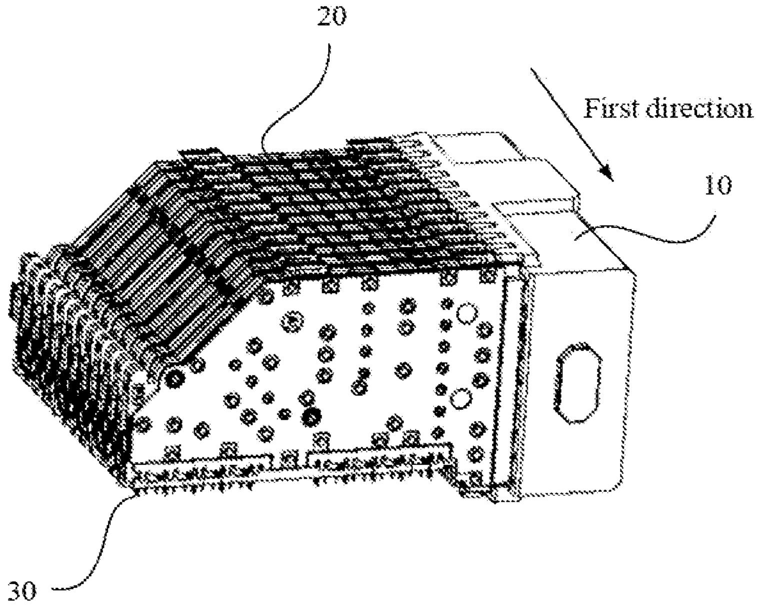
FIG. 3 is a schematic diagram of a structure of a connector according to an embodiment of this application.

FIG. 3 is a schematic diagram of a structure of a connector. The connector mainly includes three components, which are a lead frame 20, an insulation housing 10, and an end protector 30.

The lead frame 20 is a part of the structure of the connector. The connector in an embodiment of this application includes a plurality of lead frames 20. The plurality of lead frames 20 are stacked in a first direction and constitute a part of the connector. The first direction is a direction indicated by an arrow in FIG. 3.

Figure 4:
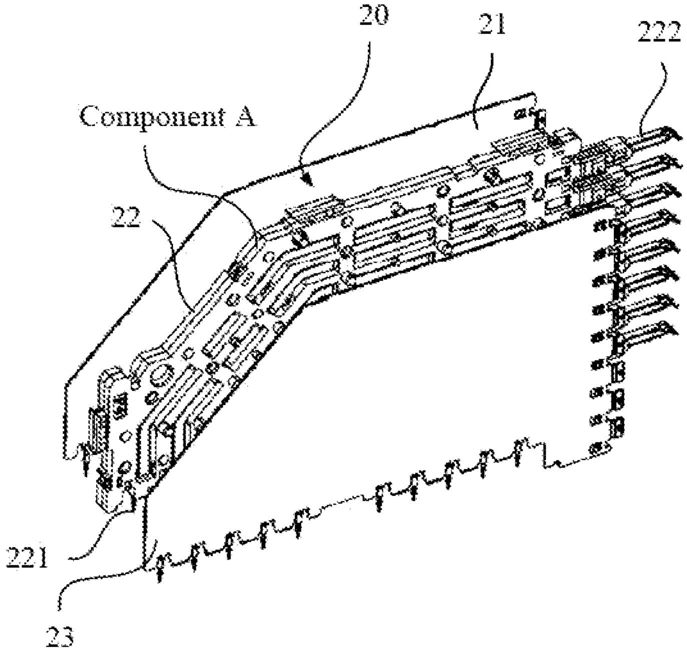
FIG. 4 is a schematic diagram of a structure of a lead frame according to an embodiment of this application.

FIG. 4 is a schematic diagram of a structure of a lead frame 20. The lead frame 20 includes a component A and two shield layers. A first shield layer 21, the component A, and a second shield layer 23 are stacked in a first direction. The first shield layer 21 and the second shield layer 23 are arranged on two sides of connection terminal groups 22, respectively. The component A includes a plurality of connection terminal groups 22 and insulation layers that wrap the connection terminal groups. Each connection terminal group includes two connection terminals configured to transfer a signal. For example, the two connection terminals are configured to transmit a differential signal or another type of signal. In embodiments of this application, the differential signal is used as an example for description.

Each connection terminal has a first connection end 221 and a second connection end 222. The first connection end 221 is configured to be plugged into a circuit board, to implement electrical connection between a connector and a circuit layer of the circuit board. The second connection end 222 is configured to fit into a slot of a connector at a peer end, to implement electrical connection between two connectors.

The two shield layers are configured to shield the plurality of connection terminal groups. For ease of description, the two shield layers are named the first shield layer 21 and the second shield layer 23, respectively. The first shield layer 21 and the second shield layer 23 are arranged on two sides of the plurality of connection terminal groups in the first direction.

The insulation housing 10 is configured to fasten the plurality of lead frames 20, and is used as a structure that cooperates with insertion and removal of the connector at the peer end. When fitting with the lead frames 20, the insulation housing 10 is fastened to the lead frames 20 and wraps the second connection ends of the connection terminals. It should be understood that the second connection ends are wrapped by the insulation housing 10 but partially exposed, for fitting with the slot of the connector at the peer end.

Figure 5:
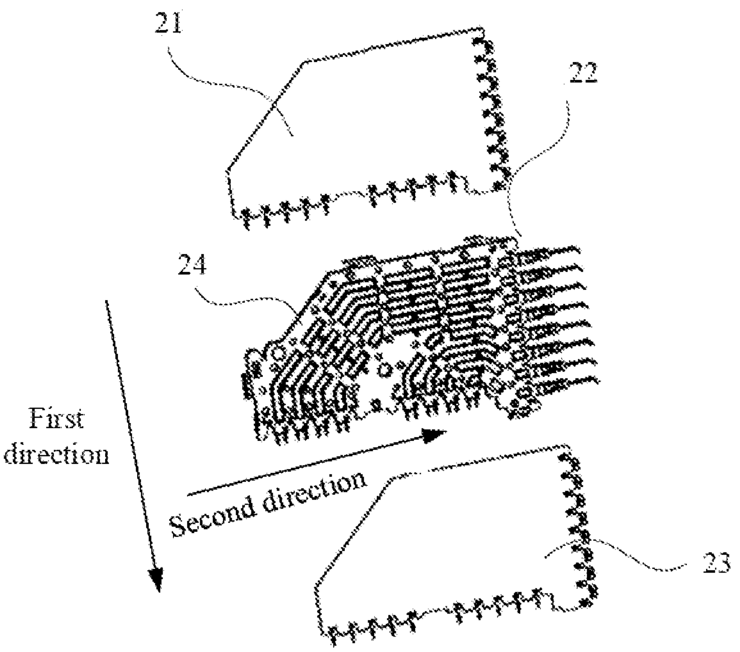
FIG. 5 is a schematic exploded view of a lead frame according to an embodiment of this application.

FIG. 5 is a schematic exploded view of a lead frame. The lead frame includes three structures: a connection terminal group 22, a shield layer, and an insulation layer 24.

There are a plurality of connection terminal groups 22. The plurality of connection terminal groups 22 are arranged in a single row in a second direction. The second direction is perpendicular to a first direction. The second direction points to a direction in which a connector is inserted into or removed from a connector at a peer end.

The shield layer includes a first shield layer 21 and a second shield layer 23. The first shield layer 21 and the second shield layer 23 are located on two sides of the lead frame. The plurality of connection terminal groups 22 are sandwiched between the first shield layer 21 and the second shield layer 23. The insulation layer 24 is disposed between the first shield layer 21 and the second shield layer 23, and wraps the connection terminal groups 22, to isolate adjacent connection terminal groups 22 and also isolate two connection terminals in each connection terminal group 22. The insulation layer 24 and the connection terminal groups 22 constitute a component A. It should be understood that connection ends of the connection terminal groups 22 are exposed outside the insulation layer 24, to ensure connection to corresponding devices.

The first shield layer 21 and the second shield layer 23 are made of a metal material with high conductivity, for example, a common material with high conductivity such as copper or aluminum. In addition, shapes of the first shield layer 21 and the second shield layer 23 are not specifically limited in embodiments of this application, provided that electromagnetic isolation can be achieved for the lead frame.

In an optional solution, when a plurality of lead frames are arranged side by side, adjacent lead frames are electromagnetically isolated by a shield layer. In this case, each lead frame includes only one shield layer, reducing a quantity of shield layers used by the entire connector and reducing costs of the connector.

It can be learned from the foregoing description that the shield layer provided in some embodiments of this application includes only the first shield layer 21 and the second shield layer 23 that are located on two sides of a surface with a larger surface area in two connection terminals. No metal shield structure is disposed between two adjacent connection terminal groups in the lead frame. Instead, air is used as a dielectric of isolation. Therefore, the sizes of a first connection terminal 221 and a second connection terminal 222 may be further increased, to form a first connection terminal 221 and a second connection terminal 222 with a larger surface area.

Figure 6:
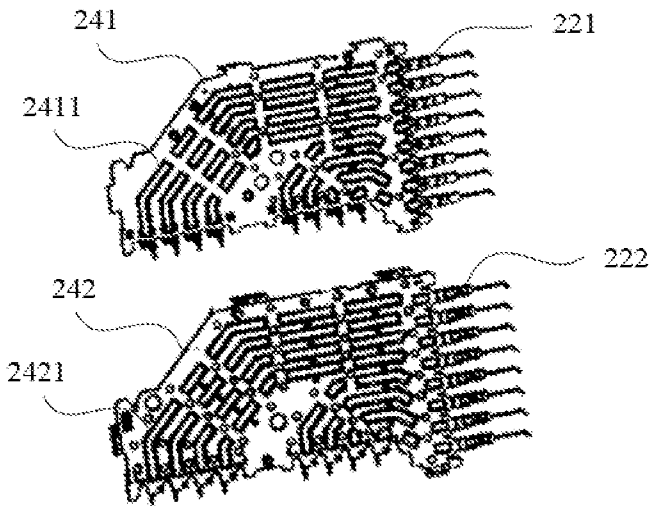
FIG. 6 is a schematic exploded view of a component A according to an embodiment of this application.

FIG. 6 is a schematic exploded view of a component A. Two connection terminals included in a connection terminal group are named a first connection terminal 221 and a second connection terminal 222, respectively. The first connection terminal 221 and the second connection terminal 222 are stacked in a first direction. The first direction is a direction in which a plurality of lead frames are stacked. During stacking, two surfaces with a larger area in the first connection terminals 221 and the second connection terminals 222 are disposed opposite to each other. First connection terminals 221 in a plurality of connection terminal groups are disposed at a same layer to form a first terminal layer. Second connection terminals 222 in the plurality of connection terminal groups are disposed at a same layer to form a second terminal layer.

An insulation layer 24 includes a first sub-insulation layer 241 and a second sub-insulation layer 242. The first sub-insulation layer 241 wraps one layer of connection terminals, and the second sub-insulation layer 242 wraps the other layer of connection terminals. For example, the first sub-insulation layer 241 wraps the first terminal layer, and the second sub-insulation layer 242 wraps the second terminal layer. In addition to being used as structures that isolate the first terminal layer and the second terminal layer, the first sub-insulation layer 241 and the second sub-insulation layer 242 may be used as support structures for connection terminals in each connection terminal layer. For example, the first sub-insulation layer 241 wraps the plurality of first connection terminals 221 in the first terminal layer, fastening the plurality of first connection terminals 221. Likewise, the second sub-insulation layer 242 may also fasten the plurality of second connection terminals 222. The connection terminal groups can be formed only by aligning and fastening the first sub-insulation layer 241 and the second sub-insulation layer 242. In this way, a first connection terminal 221 and a second connection terminal 222 in each connection terminal group can be aligned, so that they are stacked in the first direction.

In an optional solution, the insulation layer 24 may be alternatively made using an integrated structure. During production, two connection terminal layers may be fastened first, and then an integrated structure of the insulation layer 24 may be formed using an injection molding process.

In an optional solution, to ensure that the first connection terminals 221 and the second connection terminals 222 are stable after the insulation layer 24 is provided with a hollow-out structure, the first sub-insulation layer 241 wraps portions that are of the first connection terminals 221 and that are close to first connection ends and second connections ends, and the second sub-insulation layer 242 wraps portions that are of the second connection terminals 222 and that are close to first connection ends and second connections ends, to ensure stability of the connection terminals.

For ease of understanding effects of the insulation layer and the shield layer provided in embodiments of this application, the following first describes an energy loss of a signal (that is, an insertion loss of the signal) in a transfer process. The insertion loss of the signal mainly includes two parts.

1. Conductor loss caused by metal structures such as the connection terminal and the shield layer, with the conductor loss mainly related to conductivity, roughness, and a connection terminal width that are of a conductive structure.
2. Dielectric loss caused by the insulation layer 24 stuffed between the connection terminal and the shield layer, with the dielectric loss mainly determined by a dielectric loss angle.

To reduce an insertion loss of the connector, the insulation layer 24 is provided with the hollow-out structure. With the hollow-out structure, usage of an insulation material is reduced, so that air is used as a dielectric between the connection terminal and the shield layer to implement electrical isolation. In addition, when the hollow-out structure is provided, the disposed insulation layer 24 wraps a corresponding portion that is of each connection terminal and that is close to a first connection end, with the first connection ends exposed outside the insulation layer 24, so that the connection terminals can still be positioned and fastened after the hollow-out structure is provided, to ensure reliability when the connection terminals are connected to a circuit board.

With reference to FIG. 6, for providing of the hollow-out structure on the insulation layer 24, the first sub-insulation layer 241 is provided with a first hollow-out structure 2411, so that an air gap is formed between the first connection terminal 221 and the first sub-insulation layer 241. It should be understood that although a plurality of first hollow-out structures 2411 are illustrated in FIG. 6, specific providing positions, specific sizes, and a specific quantity that are of the first hollow-out structures 2411 are not limited in embodiments of this application. However, during production, the sizes and positions of the first hollow-out structures 2411 may be determined based on an actual requirement. This is not specifically limited herein. Likewise, the second sub-insulation layer 242 is also provided with a second hollow-out structure 2421. Details are not described herein again. It can be learned from a structure shown in FIG. 6 that after the first sub-insulation layer 241 is provided with the first hollow-out structure 2411 and the second sub-insulation layer 242 is provided with the second hollow-out structure 2421, usage of the insulation material can be greatly reduced, so that the first connection terminal 221 and the second connection terminal 222 are electrically isolated by air in the two hollow-out structures (the first hollow-out structure 2411 and the second hollow-out structure 2421), reducing a dielectric loss caused by a characteristic of the insulation layer 24.

It can be learned from the foregoing description that in the connector provided in embodiments of this application, there are mostly air gaps between the connection terminals and the shield layer, that is, air is used as a dielectric between the connection terminals and the shield layer. Air has a smallest dielectric constant and a smallest dielectric loss angle among known materials. Therefore, when impedance of the connector remains unchanged, use of air with a small dielectric constant can enable an increase in a design width of the connection terminal and further a decrease in a conductor loss; and use of air with a small loss angle can enable a decrease in a dielectric loss. Thus, in the connector provided in embodiments of this application, an insertion loss of a signal can be reduced from two aspects: the conductor loss and the dielectric loss.

For ease of understanding the lead frame provided in embodiments of this application, the following describes a process of producing the lead frame. First, a copper sheet is cut to form the connection terminals. The first connection terminals 221 are tiled into one layer to form the first terminal layer. Then, by using the injection molding process, an insulator is added around the connection terminals to form the first sub-insulation layer 241, to fasten the first connection terminals 221. In addition, the first hollow-out structure 2411 is formed during injection molding. The second terminal layer and the second sub-insulation layer 242 are formed in a same manner. The first sub-insulation layer 241 and the second sub-insulation layer 242 are disposed side by side. Then, the first shield layer 21 and the second shield layer 23 are added on outer sides of the first sub-insulation layer 241 and the second sub-insulation layer 242 that are disposed side by side, to form the complete lead frame.

Figure 7:
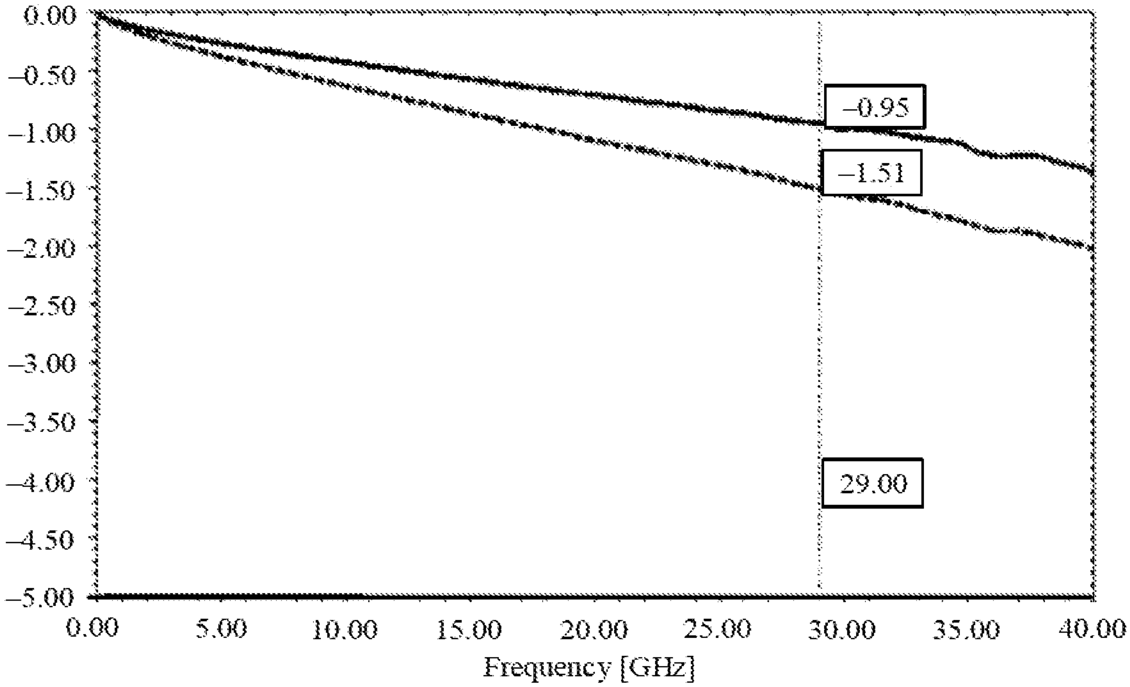
FIG. 7 is a schematic diagram of simulation effects of signal insertion losses of a connector in the conventional technology and a connector provided in an embodiment of this application.

For ease of understanding a loss reduction effect achieved by the connector provided in embodiments of this application, a simulation is performed on the connector provided in embodiments of this application and a connector in the conventional technology. FIG. 7 shows signal insertion losses obtained after a simulation is performed on a connector in the conventional technology and a connector provided in an embodiment of this application. A dashed line indicates an insertion loss of the connector in the conventional technology, and a solid line indicates an insertion loss of the connector provided in the embodiment of this application. It can be learned from FIG. 7 that an insertion loss of the connector in the conventional technology at 29 GHz is about 1.51 dB, and an insertion loss of the connector provided in the embodiment of this application at 29 GHz is about 0.95 dB. The connector provided in the embodiment of this application implements a reduction of 0.56 dB in the insertion loss, an improvement of about 37%. With the improvement, the loss meets a requirement of 112 G applications.

Figure 8:
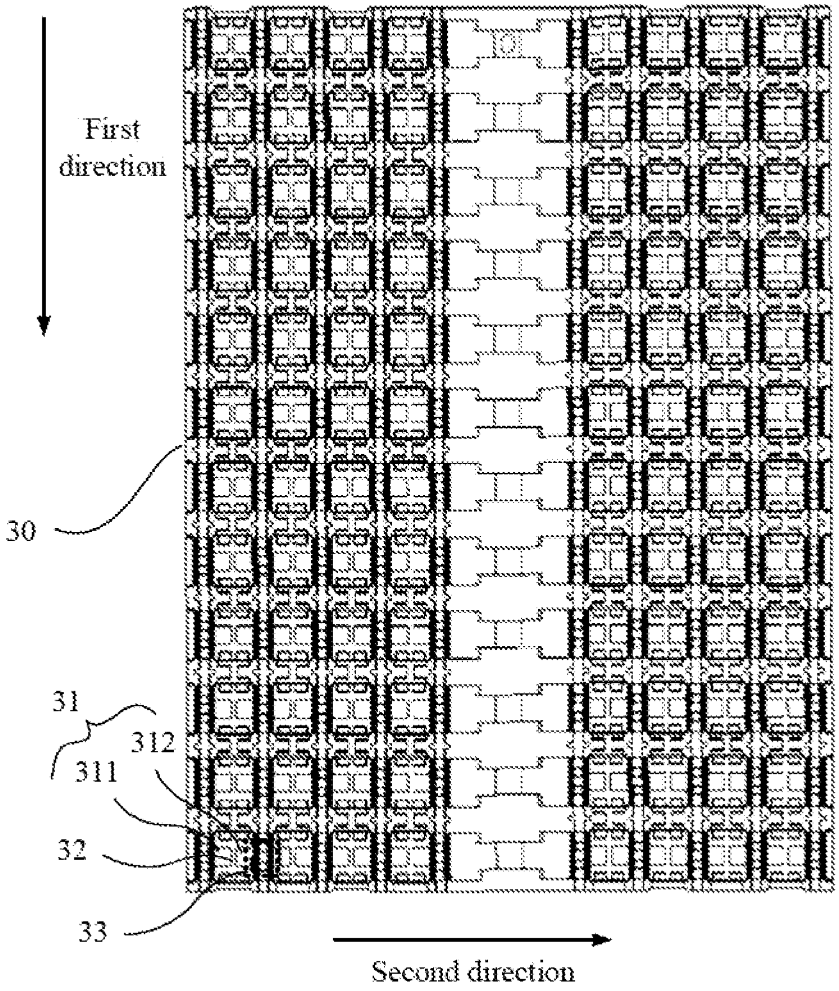
FIG. 8 is a schematic diagram of a structure of an end protector according to an embodiment of this application.

FIG. 8 is a schematic diagram of a structure of an end protector. The end protector 30 is fastened to shield layers (first shield layers and second shield layers) of a plurality of lead frames 20, to fasten the plurality of lead frames 20. In addition, the end protector 30 also serves as a connection structure and a conductive structure for a circuit board. When the end protector 30 fits with the lead frame 20, first connection ends of connection terminals (including first connection terminals 221 and second connection terminals 222) in the lead frame 20 are inserted through the end protector 30 and exposed, so that the first connection ends can be inserted into vias on a circuit layer and electrically connected to the circuit layer. When the end protector 30 fits with the circuit board, the end protector 30 is electrically connected to a ground layer of the circuit board, so that the end protector 30 and the shield layers are grounded, implementing a shield effect for the connection terminals.

The end protector 30 is a frame structure made of a conductive material, for example, a metal material or a non-metallic conductive material. For example, the end protector 30 may be a frame structure made of a material with high conductivity such as copper or aluminum.

The end protector 30 is provided with a plurality of windows 31. The plurality of windows 31 are arranged in a single row in a second direction and arranged in a plurality of rows in a first direction. A plurality of windows 31 in each row correspond to a plurality of connection terminal groups in each lead frame 20. When the end protector 30 fits with a lead frame 20, first connection ends of two connection terminals in each connection terminal group in the corresponding lead frame 20 are inserted into the windows 31. The window 31 is provided with a conductive structure 32. The conductive structure 32 crosses the window 31 and is electrically connected to side walls of the window 31. The conductive structure 32 divides the window 31 into a first sub-window 311 and a second sub-window 312. The first sub-window 311 and the second sub-window 312 correspond to first connection ends of two connection terminals in a connection terminal group, respectively.

The end protector 30 is further provided with shield structures 33. The shield structures 33 are arranged in a single row in the second direction. One shield structure 33 is disposed on each of two sides of each window 31 in the second direction, to electromagnetically isolate two adjacent windows 31 using the shield structure 33. In addition, the shield structure 33 may electromagnetically isolate two adjacent connection terminal groups in a same lead frame 20.

Figure 9:
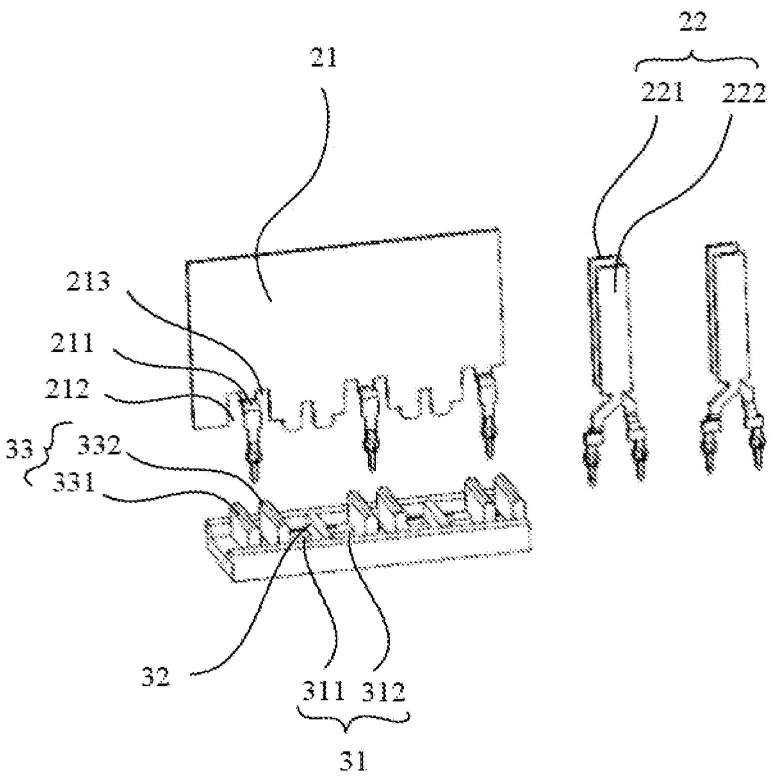
FIG. 9 is a schematic exploded view corresponding to a case in which a lead frame fits with an end protector according to an embodiment of this application.
Figure 10:
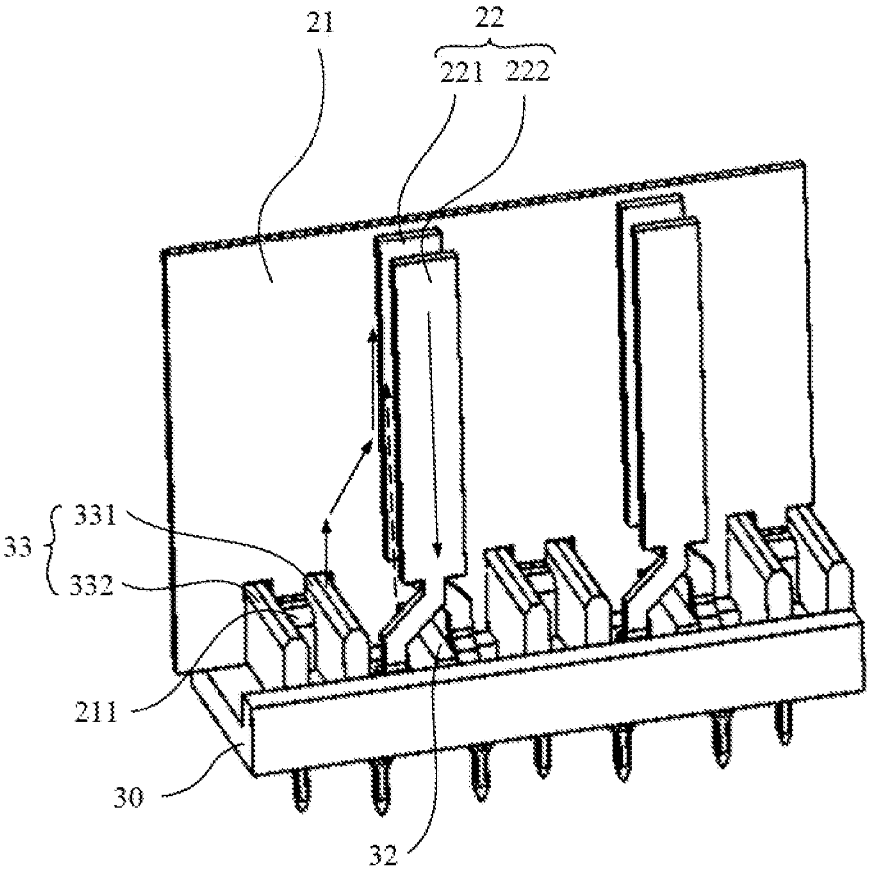
FIG. 10 is a schematic diagram corresponding to a case in which a lead frame fits with an end protector according to an embodiment of this application.

FIG. 9 is a schematic exploded view corresponding to a case in which a lead frame fits with an end protector. FIG. 10 is a schematic diagram corresponding to a case in which a lead frame fits with an end protector. For ease of illustrating a manner in which the lead frame 20 fits with the end protector 30, a first shield layer 21 of the lead frame 20 is used as an example for description in FIG. 9 and FIG. 10. For a manner in which a second shield layer 23 fits with the end protector 30, refer to a manner in which the first shield layer 21 fits with the end protector 30.

The shield structure 33 in the end protector 30 is configured to electromagnetically isolate adjacent connection terminal groups 22, to implement electromagnetic isolation between adjacent connection terminal groups 22 in a lead frame. When the shield structures 33 are disposed, the shield structures 33 and windows 31 are arranged alternately, to ensure that there is a shield structure 33 on each of two sides of the window 31 for isolation.

In an optional solution, the shield structure 33 includes a first protrusion 331 and a second protrusion 332, and the first protrusion 331 and the second protrusion 332 are bar structures, with a length direction being a first direction. There is a gap between the first protrusion 331 and the second protrusion 332. When being disposed, the first protrusions 331 and the second protrusions 332 are arranged in a second direction. When fitting with the first shield layer 21, the first protrusion 331 and the second protrusion 332 are electrically connected to the corresponding first shield layer 21 separately, to increase a contact area between the shield structure 33 and the first shield layer 21 by using the first protrusion 331 and the second protrusion 332, and further to improve an electrical connection effect between the shield structure 33 and the first shield layer 21, and to improve an electromagnetic isolation effect between different connection terminal groups.

In an optional solution, the first shield layer 21 is provided with a protruding structure 211 that is configured to be electrically connected to the shield structure 33. As shown in FIG. 10, the protruding structure 211 is inserted into the gap between the first protrusion 331 and the second protrusion 332, and is electrically connected to both the first protrusion 331 and the second protrusion 332. For example, the protruding structure 211 may be in different shapes such as a triangle or a rectangle. Two opposite sides of the protruding structure 211 are in contact with the first protrusion 331 and the second protrusion 332, respectively, to implement electrical connection between the protruding structure 211 and the two protrusions. In addition, the protruding structure 211 may be snapped onto the first protrusion 331 and the second protrusion 332, to fasten the lead frame 20 to the end protector 30.

In an optional solution, the first shield layer 21 is provided with a first notch 212 and a second notch 213 that respectively correspond to the first protrusion 331 and the second protrusion 332, and the first protrusion 331 is inserted into the corresponding first notch 212, and the second protrusion 332 is inserted into the corresponding second notch 213 for fastening. After being inserted, the first protrusion 331 and the second protrusion 332 are electrically connected to the corresponding first shield layer 21. With the first notch 212 and the second notch 213 respectively fitting with the first protrusion 331 and the second protrusion 332, a contact area between the first shield layer 21 and the end protector 30 can be further increased. It should be understood that in this embodiment of this application, the end protector 30 and the first shield layer 21 may be fastened together only in a manner of snapping the protruding structure 211 onto the first protrusion 331 and the second protrusion 332, or only in a manner of snapping the first protrusion 331 and the second protrusion 332 into the first notch 212 and the second notch 213, or in both the fastening manners.

In an optional solution, the shield structure 33 may alternatively use a protrusion, that is, one protrusion is disposed on each of two sides of the window 31. The protrusion is snapped into a notch 212 of the first shield layer 21, to implement electrical connection.

A conductive structure 32 is a bar structure, with a length direction being the first direction. The conductive structure 32 crosses the window 31, dividing the window 31 into the first sub-window 311 and the second sub-window 312. A first connection end of a first connection terminal 221 and a first connection end of a second connection terminal 222 are inserted into the first sub-window 311 and the second sub-window 312 of the window 31, respectively.

The conductive structure 32 in some embodiments of this application is configured to provide a signal loop for a differential signal. For ease of understanding, the following first describes a signal transmission process between a connector and a circuit board. A differential signal flows into a circuit layer of the circuit board through a connection terminal, and a loop signal flows into a shield layer of the connector through a ground layer of the circuit board, thus forming a signal loop. When being transmitted from the ground layer to the shield layer, the loop signal selects a path with a minimum loop inductance.

As indicated by a solid-line arrow and a dashed-line arrow in FIG. 10, a differential signal is transmitted to a circuit board through a first connection terminal 221 and a second connection terminal 222, and a loop signal is transferred to a first shield layer 21 through a conductive structure 32, thus forming a signal loop. The conductive structure 32 is located between the first connection terminal 221 and the second connection terminal 222, whereas a shield structure 33 is located on a side of a connection terminal group 22. It can be learned from a comparison between the shield structure 33 and the conductive structure 32 that between a signal loop formed by the conductive structure 32 and a signal loop formed by the shield structure 33, the signal loop formed by the conductive structure 32 encloses a smaller area, and therefore has a smaller loop inductance. Therefore, to flow into the first shield layer 21, the loop signal selects the conductive structure 32 for flowing into the first shield layer 21, and is transferred in a portion that is in the first shield layer 32 and that is close to the connection terminals. In this way, a loop signal corresponding to each connection terminal group is constrained to the vicinity of the connection terminal group, avoiding crosstalk generated between loop signals corresponding to different connection terminal groups.

Figure 11:
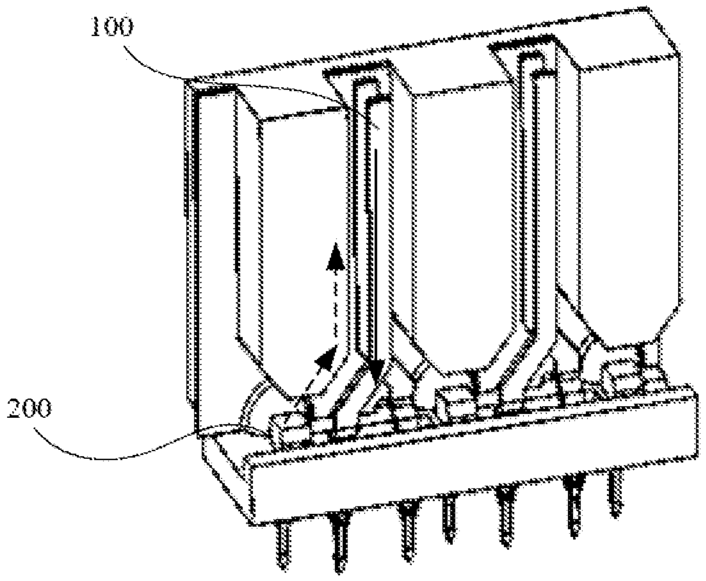
FIG. 11 is a schematic diagram of a signal transmission process in a connector in the conventional technology.

In a signal transmission process in a connector in the conventional technology shown in FIG. 11, a differential signal (indicated by a solid-line arrow) is transferred to a circuit board through a connection terminal group 100, and a loop signal (indicated by a dashed-line arrow) is transferred to a shield layer through a shield structure 200. The shield structure 200 is located between two connection terminal groups 100. Therefore, crosstalk inevitably occurs between loop signals corresponding to the two connection terminal groups 100. In some embodiments of this application, the loop signal is constrained to the vicinity of the connection terminal group by the conductive structure 32, reducing crosstalk between loop signals corresponding to two connection terminal groups.

Figure 12:
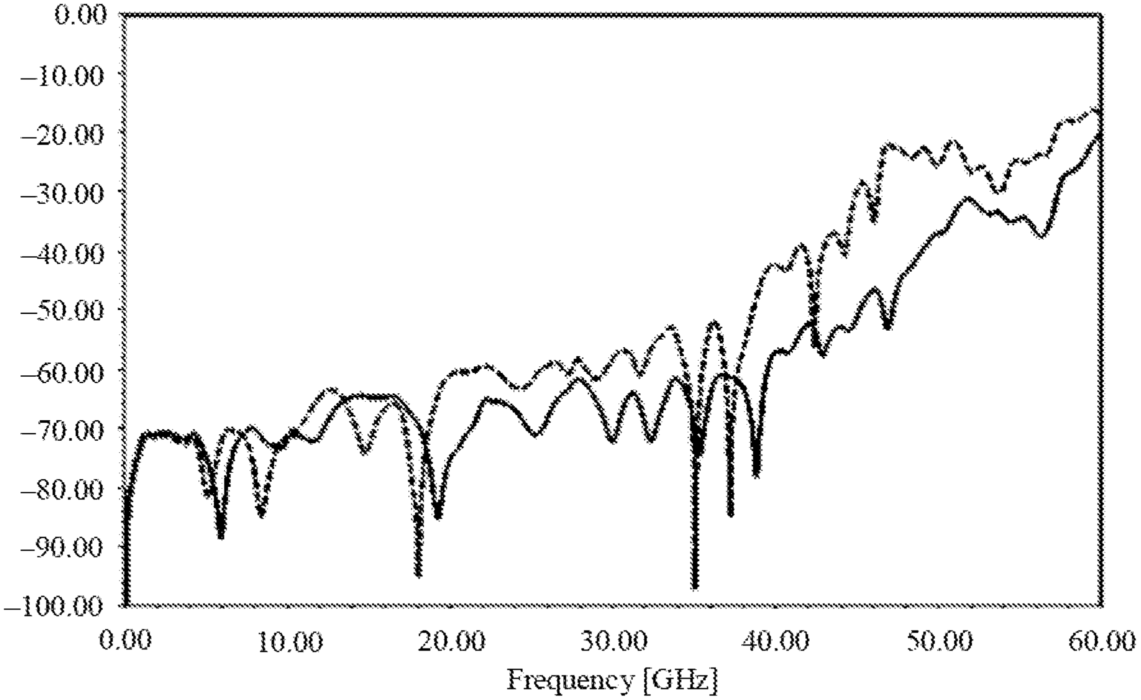
FIG. 12 is a schematic diagram of simulation effects of signal crosstalk in a connector provided in an embodiment of this application and signal crosstalk in a connector in the conventional technology.

For ease of understanding a signal crosstalk reduction effect achieved by the end protector provided in embodiments of this application, a simulation is performed on the connector provided in embodiments of this application and a connector in the conventional technology. In the connector in the conventional technology, a loop signal is transferred through a shield structure, whereas in the connector provided in embodiments of this application, a loop signal is transferred through a conductive structure. A comparison result is shown in FIG. 12. A solid line indicates a simulation result of a connector provided in an embodiment of this application, and a dashed line indicates a simulation result of a connector in the conventional technology. It can be learned from FIG. 12 that maximum crosstalk in the connector in the conventional technology reaches 20 dB at 40 GHz and in higher frequency bands, failing to meet a requirement of 112G applications. The connector provided in the embodiment of this application significantly improves crosstalk performance at 20 GHz and in higher frequency bands. For example, in 30 GHz to 40 GHz frequency bands, there is an improvement of at least 10 dB, and in 40 GHz to 50 GHz frequency bands, there is an improvement of at least 20 dB. With the improvement, crosstalk performance can meet the requirement of 112G applications.

Figure 13:
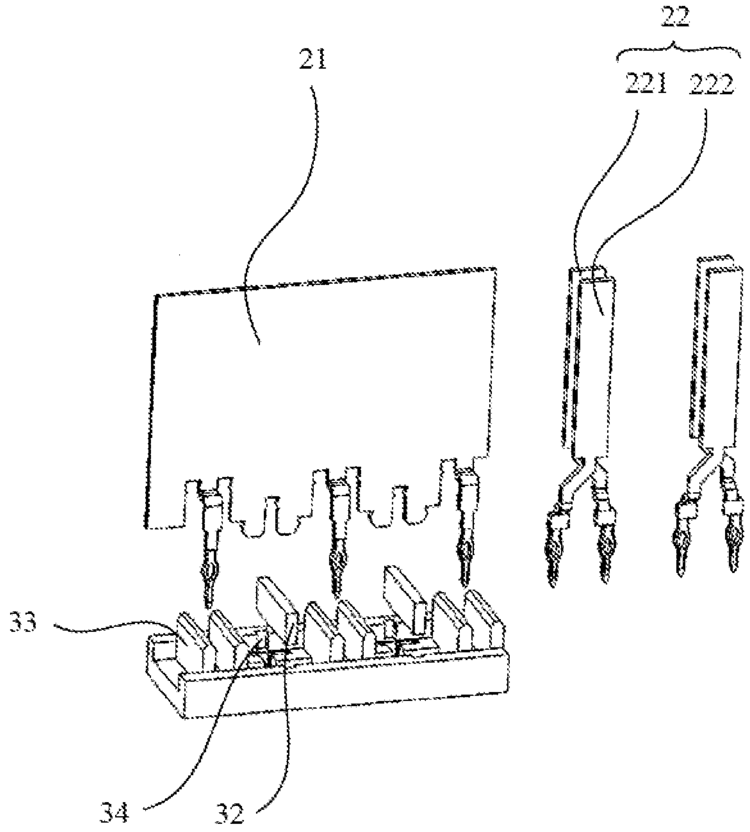
FIG. 13 is a schematic exploded view corresponding to a case in which an end protector fits with a lead frame according to an embodiment of this application.
Figure 14:
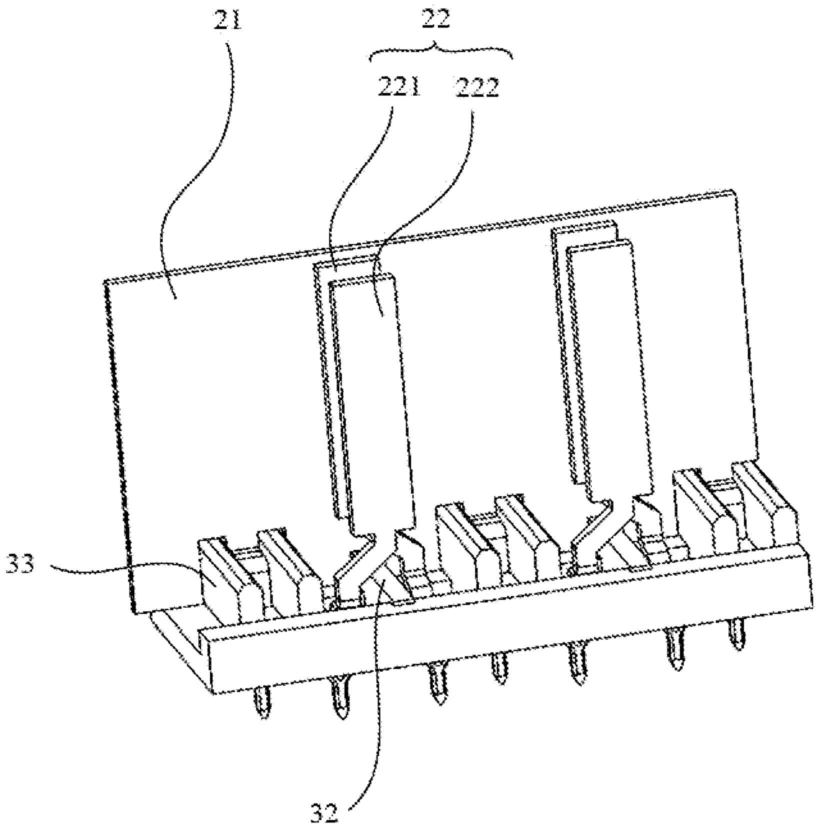
FIG. 14 is a schematic diagram corresponding to a case in which an end protector fits with a lead frame according to an embodiment of this application.

FIG. 13 is a schematic exploded view corresponding to a case in which an end protector fits with a lead frame. FIG. 14 is a schematic diagram corresponding to a case in which an end protector fits with a lead frame. As shown in FIG. 13 and FIG. 14, two opposite side walls of a window 31 in the end protector are provided with slots 34. Two ends of a conductive structure 32 are respectively inserted into the slots 34 in a one-to-one correspondence manner, and are fastened to the two side walls of the window.

In an optional solution, a height of a shield structure 33 is greater than a height of the conductive structure 32. That is, the conductive structure 32 is disposed low, to ensure a sufficient isolation distance between the conductive structure 32 and a first connection terminal 221 and between the conductive structure 32 and a second connection terminal 222, so as to avoid electrical connection between the conductive structure 32 and the first connection terminal 221 and between the conductive structure 32 and the second connection terminal 222.

In an optional solution, the height of the conductive structure 32 is greater than a height of the window 31, so that the conductive structure 32 is exposed outside the window 31 and snapped into a first shield layer 21.

In an optional solution, there may be one or more conductive structures 32. When a plurality of conductive structures 32 are used, the plurality of conductive structures 32 may be arranged in a second direction.

In an optional solution, the conductive structure 32 and the end protector 30 may be of an integrated structure, or may be of a split structure. When the split structure is used, the conductive structure 32 is snapped into the window 31 in the end protector 30 and electrically connected to the end protector 30.

In an optional solution, a minimum distance between any connection terminal in each connection terminal group and a conductive structure 32 corresponding to the connection terminal group is a first distance, a minimum distance between any connection terminal in each connection terminal group and a shield structure 33 corresponding to the connection terminal group is a second distance, and the first distance is less than the second distance.

An embodiment of this application further provides a functional board. The functional boards may be different functional boards such as a backplane and a service board. The functional board includes a circuit board, and the connector according to any one of the foregoing items that is disposed on the circuit board. A connection end of each connection terminal is electrically connected to a circuit layer of the circuit board. In the foregoing technical solution, with the shield layer, electromagnetic isolation is implemented between lead frames; with the shield structure that is disposed on the end protector, electromagnetic isolation is implemented between different connection terminal groups in a lead frame; and with the conductive structure that is on the end protector, electromagnetic isolation is implemented between different connection terminals in a same connection terminal group. In this way, crosstalk in the connector is reduced, signal crosstalk between different lead frames, between different connection terminal groups, and between different connection terminals is reduced, and a communication effect of the connector is improved.

An embodiment of this application further provides a board-level architecture. The board-level architecture includes a backplane and a plug-in board. At least one of the backplane and the plug-in board is the foregoing functional board. The backplane and the plug-in board are connected through a connector. In the foregoing technical solution, with the shield layer, electromagnetic isolation is implemented between lead frames; with the shield structure that is disposed on the end protector, electromagnetic isolation is implemented between different connection terminal groups in a lead frame; and with the conductive structure that is on the end protector, electromagnetic isolation is implemented between different connection terminals in a same connection terminal group. In this way, crosstalk in the connector is reduced, signal crosstalk between different lead frames, between different connection terminal groups, and between different connection terminals is reduced, and a communication effect of the connector is improved.

It is clear that a person skilled in the art can make various modifications and variations to this application without departing from the spirit and scope of this application. In this way, this application is intended to cover these modifications and variations of this application provided that they fall within the scope defined by the claims of this application and their equivalent technologies.

What is claimed is:

1. A connector, comprising an end protector and a plurality of lead frames, wherein the plurality of lead frames are stacked in a first direction;

each lead frame comprises a plurality of connection terminal groups and a shield layer, each connection terminal group comprises two connection terminals configured to transmit a signal, each connection terminal has a first connection end that cooperates with insertion of a circuit board, and the shield layer is configured to electromagnetically isolate connection terminal groups in adjacent lead frames; and the end protector comprises a conductive structure that is located between the first connection ends of the two connection terminals in each connection terminal group, and the conductive structure is electrically connected to the shield layer of the lead frame to which the connection terminal group belongs and is configured to transmit a loop signal corresponding to the signal, wherein the end protector further comprises a plurality of shield structures, each shield structure comprises a first protrusion and a second protrusion, there is a gap between the first protrusion and the second protrusion, and the first protrusion and the second protrusion are electrically connected to corresponding shield layer separately.

2. The connector according to claim 1, wherein each shield structure is configured to electromagnetically isolate two adjacent connection terminal groups in each lead frame, and each shield structure is electrically connected to the corresponding shield layer of the two adjacent connection terminal groups.

3. The connector according to claim 1, wherein each shield layer is provided with protruding structures that are used with corresponding shield structures in a one-to-one correspondence; and each protruding structure is inserted into a gap between a first protrusion and a second protrusion of the corresponding shield structure, and is electrically connected to both the first protrusion and the second protrusion.

4. The connector according to claim 1, wherein each shield layer is provided with notches that correspond to first protrusions and second protrusions of corresponding shield structures, and the first protrusions and the second protrusions are respectively inserted into the corresponding notches and electrically connected to the corresponding shield layer.

5. The connector according to claim 2, wherein a height of the shield structure is greater than a height of the conductive structure.

6. The connector according to claim 2, wherein a minimum distance between any connection terminal in each connection terminal group and a conductive structure corresponding to the connection terminal group is a first distance, and a minimum distance between any connection terminal in each connection terminal group and a shield structure corresponding to the connection terminal group is a second distance; and the first distance is less than the second distance.

7. The connector according to claim 1, wherein each connection terminal group further comprises an insulation layer, and the insulation layer wraps the plurality of connection terminals in the connection terminal group, with the first connection end of each connection terminal exposed outside the insulation layer; and the insulation layer is provided with a hollow-out structure, and each connection terminal group is partially exposed in the hollow-out structure.

8. The connector according to claim 7, wherein one connection terminal in each connection terminal group is located at a first terminal layer, the other connection terminal in the connection terminal group is located at a second terminal layer, and the first terminal layer and the second terminal layer are stacked in the first direction; and the insulation layer comprises a first sub-insulation layer and a second sub-insulation layer, the first sub-insulation layer wraps the first terminal layer, and the second sub-insulation layer wraps the second terminal layer.

9. The connector according to claim 8, wherein the first sub-insulation layer and the second sub-insulation layer each have the hollow-out structure.

10. The connector according to claim 1, wherein the connector further comprises an insulation housing; and each connection terminal has a second connection end configured to fit with a connector at a peer end, and the insulation housing wraps the second connection end.

11. A functional board comprising a circuit board and a connector, the connector comprising an end protector and a plurality of lead frames, wherein the plurality of lead frames are stacked in a first direction;

each lead frame comprises a plurality of connection terminal groups and a shield layer, each connection terminal group comprises two connection terminals configured to transmit a signal, each connection terminal has a first connection end that cooperates with insertion of a circuit board, and the shield layer is configured to electromagnetically isolate connection terminal groups in adjacent lead frames; and the end protector comprises a conductive structure that is located between the first connection ends of the two connection terminals in each connection terminal group, and the conductive structure is electrically connected to the corresponding shield layer of the connection terminal group, and is configured to transmit a loop signal corresponding to the signal, wherein the end protector further comprises a plurality of shield structures, each shield structure comprises a first protrusion and a second protrusion, there is a gap between the first protrusion and the second protrusion, and the first protrusion and the second protrusion are electrically connected to corresponding shield layer separately, wherein the first connection end of each connection terminal is electrically connected to a circuit layer of the circuit board.

12. The functional board of claim 11, wherein each shield structure is configured to electromagnetically isolate two adjacent connection terminal groups in each lead frame, and each shield structure is electrically connected to the corresponding shield layer of the two adjacent connection terminal groups.

13. The functional board of claim 11, wherein each shield layer is provided with protruding structures that are used with corresponding shield structures in a one-to-one correspondence; and each protruding structure is inserted into a gap between a first protrusion and a second protrusion of the corresponding shield structure, and is electrically connected to both the first protrusion and the second protrusion.

14. The functional board of claim 11, wherein each shield layer is provided with notches that correspond to first protrusions and second protrusions of corresponding shield structures, and the first protrusions and the second protrusions are respectively inserted into the corresponding notches and electrically connected to the corresponding shield layer.

15. A board-level architecture, comprising a backplane and a plug-in board, wherein at least one of the backplane and the plug-in board is a functional board that comprises a circuit board and a connector, the connector comprising an end protector and a plurality of lead frames, wherein the plurality of lead frames are stacked in a first direction;

each lead frame comprises a plurality of connection terminal groups and a shield layer, each connection terminal group comprises two connection terminals configured to transmit a signal, each connection terminal has a first connection end that cooperates with insertion of a circuit board, and the shield layer is configured to electromagnetically isolate connection terminal groups in adjacent lead frames; and the end protector comprises a conductive structure that is located between the first connection ends of the two connection terminals in each connection terminal group, and the conductive structure is electrically connected to the shield layer of the of the lead frame to which the connection terminal group belongs and is configured to transmit a loop signal corresponding to the signal, wherein the end protector further comprises a plurality of shield structures, each shield structure comprises a first protrusion and a second protrusion, there is a gap between the first protrusion and the second protrusion, and the first protrusion and the second protrusion are electrically connected to corresponding shield layer separately, wherein the first connection end of each connection terminal is electrically connected to a circuit layer of the circuit board; and the backplane and the plug-in board are connected through the connector.

16. The board-level architecture of claim 15, wherein each shield structure is configured to electromagnetically isolate two adjacent connection terminal groups in each lead frame, and each shield structure is electrically connected to the corresponding shield layer of the two adjacent connection terminal groups.

17. The board-level architectural of claim 15, wherein each shield layer is provided with protruding structures that are used with corresponding shield structures in a one-to-one correspondence; and each protruding structure is inserted into a gap between a first protrusion and a second protrusion of the corresponding shield structure, and is electrically connected to both the first protrusion and the second protrusion.

18. The board-level architecture of claim 15, wherein each shield layer is provided with notches that correspond to first protrusions and second protrusions of corresponding shield structures, and the first protrusions and the second protrusions are respectively inserted into the corresponding notches and electrically connected to the corresponding shield layer.

19. The board-level architecture of claim 15, wherein each connection terminal group further comprises an insulation layer, and the insulation layer wraps the plurality of connection terminals in the connection terminal group, with the first connection end of each connection terminal exposed outside the insulation layer; and the insulation layer is provided with a hollow-out structure, and each connection terminal group is partially exposed in the hollow-out structure.

* * * * *